Patented Apr. 27, 1948

2,440,318

UNITED STATES PATENT OFFICE 2,440,318

CATALYTIC POLYMERISATION OF METHYL METHACRYLATE

Francis Thomas White and Arthur John Daly, Spondon, near Derby, England, assignors, by mesne assignments, to Celanese Corporation of America, a corporation of Delaware No Drawing. Application January 23, 1945, Serial No. 574,220. In Great Britain January 24, 1944

3 Claims. (Cl. 260—83)

1

This invention relates to the catalytic polymerisation of methyl methacrylate and other olefinic compounds, especially compounds containing ester groups.

U. S. patent application S. No. 547,805, filed August 2, 1944, in the name of Henry Dreyfus, describes the production of polymerisation products of methyl methacrylate and like compounds in the form of a powder or a material which can readily be powdered, by conducting the polymerisation of the monomer while it is in solution, preferably together with a plasticiser, in a liquid comprising a volatile solvent for the desired polymer diluted with water, and removing the volatile solvent and the water.

According to the present invention, polymers are produced by polymerising an olefinic compound in solution in a liquid consisting for the most part of a mixture of a solvent and a nonsolvent for said compound and containing a small proportion of hydrogen peroxide.

The most important application of the invention is in the polymerisation of water-insoluble olefinic compounds. It is preferred to polymerise such compounds in solution in a liquid consisting for the most part of water and a solvent (for the polymer) which is more volatile than water, i. e. which has a higher vapour pressure at 20° C. than water, the hydrogen peroxide being in solution in this liquid.

Plasticised polymers may be obtained by dissolving in the solution of the olefinic substance a solvent-plasticiser for the polymer.

The process of the invention is of special importance in the production of polymerised methyl methacrylate and other polymers of the formula $CH_2=CR_1COOR_2$ where $R_1$ is hydrogen or methyl, and $R_2$ is an aliphatic hydrocarbon residue containing not more than 4 carbon atoms.

It will generally be found desirable to carry out the polymerisation at a temperature substantially above atmospheric temperature but below 100° C. In general the higher the temperature the more rapid will be the polymerisation but the lower the molecular weight of the polymer. We have obtained the best results at temperatures between 50 and 80° C., and especially between 60 and 75° C., and with such proportions of water to solvent that any substantial reduction of the temperature would result in production of substantial quantities of a second liquid phase. The presence of small quantities, e. g. less than 1% of the total volume of the solution, of a second liquid phase is not objectionable but production of substantial quantities of a second liquid

2 phase during or at the outset of polymerisation is to be avoided. In general, the lower the temperature at which polymerisation is to be carried out, the lower the proportion of water that is permissible if production of a second liquid phase is to be avoided. It is preferred, however, as indicated above, to have sufficient water present for the system to form two liquid phases not only at atmospheric temperature but at all temperatures below that at which polymerisation is carried out. We prefer to work with concentrated solutions of the olefinic compound, i. e. solutions in which that compound is dissolved in less than its own weight of the liquid. By working with a concentrated solution of the olefinic compound in a volatile solvent diluted with a quantity of water just insufficient to cause separation into two liquid phases at the polymerisation temperature (e. g. a mixture of acetone and water in the proportions of about 3:1 by weight) the polymer may be obtained in the form of a highly viscous liquid or dope, from which it may be recovered in friable form by evaporation of the solvent at a relatively low temperature, i. e. below 100° C. and preferably below 60° C.

By the process of the invention we have obtained polymers of higher molecular weight (as indicated by viscosity measurements) and of greater clarity than are obtained under similar conditions using an organic peroxide as the catalyst. The proportion of hydrogen peroxide to monomer required to give substantially complete polymerisation in a given time under the conditions specified is relatively low, e. g. excellent results have been obtained by the use of 0.05 to 0.5% of hydrogen peroxide on the weight of the methyl methacrylate or other olefinic compound.

The following examples, in which all the parts are by weight, illustrate the invention.

Example 1

A mixture formed by adding to 100 parts of methyl methacrylate 50 parts of 95% acetone and 18 parts of a 0.7% aqueous solution of hydrogen peroxide is heated in a closed vessel, with stirring, at 70° C. (at which temperature the mixture is homogeneous) until all the methyl methacrylate is consumed. The resulting, highly viscous, reaction mixture is then fed to the nip of a pair of water-cooled rolls set to give a tight nip and to rotate both at the same speed. In this way the bulk of the acetone and water is removed at a temperature below 60° C. and a friable stock is obtained. This is powdered and dried in trays at about 60° C.

In this way polymerised methyl methacrylate of molecular weight such that the viscosity of a 5% solution in 95% aqueous acetone at 25° C. is about 3000 centipoises, can be obtained.

Example 2

The process is carried out as in Example 1 except that in making up the initial mixture 10 to 15 parts of dibutyl phthalate and 40 to 35 parts of acetone are used instead of 50 parts of acetone.

The process yields a plasticised polymer from which moulded articles can be produced by a hot, compression-moulding operation.

Example 3

The process is carried out as in Example 2 except that the initial mixture is of the following composition:

|  | Parts |
|---|---|
| Methyl methacrylate | 125 |
| Dimethyl phthalate | 10 |
| 95% acetone | 64 |
| Water | 23.5 |
| Hydrogen peroxide | 0.625 |

The resulting plasticised polymer is of lower molecular weight than that of Example 2 but can be formed into strong, transparent, mouldings at a temperature of about 180° C. and pressure about 3000 lbs. per square inch.

The process of the invention enables considerable variation in the qualities of the product, especially molecular weight, impact strength, and softening temperatures, to be obtained by varying the proportion of hydrogen peroxide based on the weight of monomer. This can be illustrated with reference to the variation in the viscosity of standard acetone solutions of the polymer, obtainable by varying the proportion of catalyst. Under the conditions specified in Example 3 above, wherein the proportion of catalyst is about 0.5% of the monomer, a polymer is obtained which in 5% solution in acetone at 25° C. gives by the Ostwald method a viscosity of about 300 centipoises. If the proportion of catalyst be increased to 1% of the weight of the monomer, other conditions being maintained constant, a polymer having a viscosity of only about 50 centipoises is obtained. A further increase in the proportion of catalyst to 2% on the weight of the monomer reduces the viscosity of the polymer measured under the same conditions as before to about 7 centipoises, while a still further increase in the catalyst proportion to 3% on the weight of the monomer gives a polymer of viscosity only about 3 centipoises. On the other hand, if the catalyst proportion be decreased below 0.5% of the weight of the monomer a considerable increase in molecular weight, as indicated by viscosity, is obtained. Thus when the catalyst proportion is 0.25% of the weight of the monomer, a polymer of viscosity about 1,100 centipoises is obtained while with a further reduction of this proportion to about 0.125% of the weight of the monomer (as in Example 1) the viscosity of the polymer rises to about 3,000 centipoises. It is clear, therefore, that a very large range of viscosities, from which a correspondingly large range of molecular weight of polymer is to be inferred, is obtainable at will, according to the proportion of catalyst employed, based on the weight of the monomer.

The temperature at which polymerisation is conducted can also be varied and such variation also results in a variation in molecular weight of the polymer as indicated by viscosity. Thus while, as indicated above, a polymer of viscosity about 300 centipoises is obtained by polymerisation at 70° C. with about 0.5% of the catalyst on the weight of the monomer, at 80° C. the viscosity obtained is only about 45 centipoises. Increase of the temperature of polymerisation to 90° C. results in a decrease in the viscosity to about 24 centipoises while at 100° C. the viscosity is only about 12 centipoises.

From a large number of moulding trials carried out it appears that to obtain non-brittle sheets, it is desirable for the polymer to have a viscosity, measured as described above, of at least 30 centipoises and the viscosity of the polymer is preferably considerably higher, for example of the order of 100 centipoises or more. In general, the higher the viscosity of the polymer the higher the softening temperature and in consequence the greater the pressure, temperature, and time for moulding.

As the liquid reaction medium, aqueous acetone has been specified. We may, however, employ other liquid mixtures obtainable by diluting a volatile solvent for the monomer with a non-solvent therefor, preferably water, the mixture being a solvent for hydrogen peroxide and for the olefinic compound and the polymer at the temperature at which polymerisation is to be carried out. Thus, instead of acetone, other volatile solvents for the polymer which are miscible with water can be employed, e. g. methyl acetate, ethylene-methylene ether or methylal.

Other plasticisers can be employed instead of those specified above, e. g. diethyl phthalate, di-(methoxyethyl) phthalate, methyl-phthallyl ethyl glycollate, tricresyl phosphate and tri-(monochlorethyl) phosphate. Plasticisers which are soluble to a substantial degree in water, are of course, unsuitable.

After polymerisation has been carried to the desired degree, instead of treating the reaction mixture on the roll mill to remove the bulk of the acetone and water and at the same time to crumble the stock, as described above, the stock may be thrown down by addition of water or other precipitant to the reaction mixture, and may then be separated, washed, crumbled to a powder if necessary, and dried. The polymer may then be separated and treated as described above. Yet another method, which is most applicable in the production of ploymers of relatively low molecular weight, is to free the reaction mixture from the volatile solvent and at least a part of the water, by spraying the reaction mixture into a hot dry atmosphere or on to a hot travelling band or rotating drum.

The invention has been described with particular reference to the production of ploymers of methyl methacrylate. Among other olefinic compounds which may be polymerised by the process of the invention are: ethyl acrylate, vinyl acetate, and acrylic or alkyl-acrylic esters of allyl alcohol, methallyl alcohol, or of ethylidene glycol. Co-polymers of two or more of such olefinic monomers may also be produced by the process of the invention. Polymerisation may be effected in the presence of a minor proportion of a substance capable of forming cross-linkages between the chains of the polymer, e. g. a bi-functional olefinic compound such as di-vinyl ketone, di-isopropenyl ketone or a bi-functional ester such as the esters of allyl alcohol, methallyl alcohol and ethylidene glycol specified above.

Having described our invention, what we desire to secure by Letters Patent is:

1. Process for the production of polymerised polymethyl methacrylate which comprises heating a solution of 100 parts by weight of methyl methacrylate in less than its own weight of a mixture consisting of 35 to 50 parts by weight of 95% of acetone and 18 parts by weight of water, said mixture containing hydrogen peroxide in the proportion of 0.125 to 0.25% of the weight of the methyl methacrylate, and the temperature being maintained just high enough to avoid the formation of any substantial quantity of a second liquid phase, until substantially the whole of the methyl methacrylate has been consumed, removing solvent from the reaction mixture by evaporation at a temperature below 60° C. and recovering the polymer in friable form.

2. Process for the production of plasticised polymethyl methacrylate, which comprises heating a solution of 100 parts by weight of methyl methacrylate in less than its own weight of a mixture consisting of 35 to 50 parts by weight of 95% acetone, 18 parts by weight of water and a solvent-plasticiser for the polymer, the amount of plasticiser being from 5 to 20% of the weight of the methyl methacrylate, said mixture containing hydrogen peroxide in the proportion of 0.125 to 0.25% of the weight of the methyl methacrylate, and the temperature being maintained just high enough to avoid the formation of any substantial quantity of a second liquid phase, until substantially the whole of the methyl methacrylate has been consumed, removing solvent from the reaction mixture by evaporation at a temperature below 60° C. and recovering the plasticised polymer in friable form.

3. Process according to claim 2, wherein the plasticiser is dibutyl phthalate.

FRANCIS THOMAS WHITE.
ARTHUR JOHN DALY.

REFERENCES CITED

The following references are of record in the file of this patent:

UNITED STATES PATENTS

| Number | Name | Date |
|---|---|---|
| 2,071,932 | Macht | Feb. 23, 1937 |
| 2,072,904 | Ries | Mar. 9, 1937 |
| 2,121,839 | Strain | June 28, 1938 |
| 2,135,443 | Strain | Nov. 1, 1938 |

OTHER REFERENCES

Strain: Ind. and Eng. Chem., vol. 30, No. 3, March 1938, pp. 345 to 347.